(12) United States Patent
McClintock

(10) Patent No.: US 9,339,952 B2
(45) Date of Patent: May 17, 2016

(54) NANOFLUID MOLD COOLING

(71) Applicant: Magna International Inc., Aurora, OH (US)

(72) Inventor: Steven D. McClintock, South Lyon, MI (US)

(73) Assignee: MAGNA INTERNATIONAL, INC., Aurora (CA)

( * ) Notice: Subject to any disclaimer, the term of this patent is extended or adjusted under 35 U.S.C. 154(b) by 0 days.

(21) Appl. No.: 14/409,089

(22) PCT Filed: Jun. 20, 2013

(86) PCT No.: PCT/US2013/046787
§ 371 (c)(1),
(2) Date: Dec. 18, 2014

(87) PCT Pub. No.: WO2014/004253
PCT Pub. Date: Jan. 3, 2014

(65) Prior Publication Data
US 2015/0174794 A1    Jun. 25, 2015

Related U.S. Application Data

(60) Provisional application No. 61/662,111, filed on Jun. 20, 2012.

(51) Int. Cl.
*B29C 35/16*    (2006.01)
*B29C 45/73*    (2006.01)
(Continued)

(52) U.S. Cl.
CPC .................. *B29C 35/16* (2013.01); *B29C 45/73* (2013.01); *C09K 5/10* (2013.01); *B29C 33/04* (2013.01); *B29C 2035/1625* (2013.01)

(58) Field of Classification Search
CPC   B29C 2035/1625; B29C 33/04; B29C 35/16; B29C 45/73
See application file for complete search history.

(56) References Cited

U.S. PATENT DOCUMENTS

| 3,375,865 | A | * | 4/1968 | Boichenko et al. .... | B22D 11/05 164/436 |
| 4,344,903 | A | * | 8/1982 | Pascouet ................. | B29C 33/04 249/79 |

(Continued)

FOREIGN PATENT DOCUMENTS

| JP | 2005035164 A | 2/2005 |
| JP | 2005335170 A | 12/2005 |

OTHER PUBLICATIONS

Electronic translation of Japanese 2005-035164.*
(Continued)

*Primary Examiner* — Jill Heitbrink
(74) *Attorney, Agent, or Firm* — Warn Partners, P.C.

(57) ABSTRACT

A nanofluid molding arrangement includes a mold tool (12) having movable pieces (14, 16) that move between an open and closed position. When the moveable pieces (14, 16) are in the closed position, they form a mold cavity (18) that defines a surface for creating a molded part. The nanofluid molding arrangement also includes at least one injection port (22) for injecting molten resin directly into the mold cavity (18) such that when molten resin flows into the cavity and begins to cool, the molded part begins to form. After the molded part begins forming and injection of the molten resin is stopped, a nanofluid having a colloidal suspension of thermally conductive nanoparticles suspended in an aqueous or organic solution is applied to the mold tool (12), through at least one cooling port, to wick away or draw heat out and cool the mold cavity and the formed part within the mold cavity (18).

5 Claims, 4 Drawing Sheets

(51) Int. Cl.
*C09K 5/10* (2006.01)
*B29C 33/04* (2006.01)

(56) References Cited

U.S. PATENT DOCUMENTS

| | | |
|---|---|---|
| 2006/0032243 A1 | 2/2006 | Chen |
| 2007/0120088 A1 | 5/2007 | Yang et al. |
| 2011/0135780 A1 | 6/2011 | Yeh |
| 2011/0175017 A1 | 7/2011 | Mohapatra |
| 2012/0199320 A1* | 8/2012 | Richardson ............... C09K 5/10 165/104.11 |
| 2013/0295219 A1* | 11/2013 | Neufarth ............... B29C 33/046 425/552 |

OTHER PUBLICATIONS

S.M. Mohamed Nainar, et al., Nanotech Conference & Expo 2011, Jun. 13, 2011; Nanofluid colled Injection Moulded Products; Retrieved from Internet URL: http://www.techconnectworld.com/Nanotech201/a.html?i=1356 [retrieved on Aug. 12, 2015].

International Search Report and Written Opinion for International Application No. PCT/US2013/046787 dated Oct. 16, 2013.

* cited by examiner

NANOFLUID MOLD COOLING

CROSS-REFERENCE TO RELATED APPLICATIONS

This application claims the benefit of U.S. Provisional Application No. 61/662,111, filed 20 Jun. 2012.

FIELD OF THE INVENTION

The present invention is directed to the use of nanofluids in cooling arrangements for cooling a newly formed molded product within a mold cavity.

BACKGROUND OF THE INVENTION

One of the obstacles faced during production of molded parts is the cycle time for manufacturing. One factor contributing to cycle time is the time that it takes for the newly formed molded part to cool in the mold to a temperature suitable for handling and removal. Molded parts are often produced on a mold tool having movable portions that form a mold cavity for receiving molten resin. After the resin takes shape as a molded part, coolant, such as water, is introduced to the mold cavity to cool the molded part. Past systems utilize a flow stream of water that is introduced to the mold cavity and newly formed molded part through an inlet port and flows across the molded part and out an exit port formed in the mold tool. Conventional molding processes have always used water as a cooling fluid; however, it is desirable to develop other types of cooling fluid that are thermally conductive and absorb and remove the heat from the molded part more quickly during the cooling phase. The result is that the molded part will cool quicker and the cycle time will be reduced. It is also desirable to use a cooling fluid that can be used in connection with conventional molding tools.

SUMMARY OF THE INVENTION

The present invention is directed to a nanofluid molding arrangement. The arrangement includes a mold tool having movable pieces that move between an open and closed position. When the moveable pieces are in the closed position, they form a mold cavity that defines a surface for creating a molded part. The nanofluid molding arrangement also includes at least one injection port for injecting molten resin directly into the mold cavity such that when molten resin flows into the cavity and begins to cool, the molded part begins to form. After the molded part begins forming and injection of the molten resin is stopped, a nanofluid having a colloidal suspension of thermally conductive nanoparticles suspended in an aqueous or organic solution is applied to the mold tool, through at least one cooling port, to wick away or draw heat out and cool the mold cavity and the formed part within the mold cavity. The nanofluid is used to cool the newly formed molded parts by absorbing heat via thermal conductivity. After the nanofluid flows through the mold tool it exits through at least one exhaust port extending through the mold tool where the fluid can be cooled and recirculated back through the molding arrangement.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
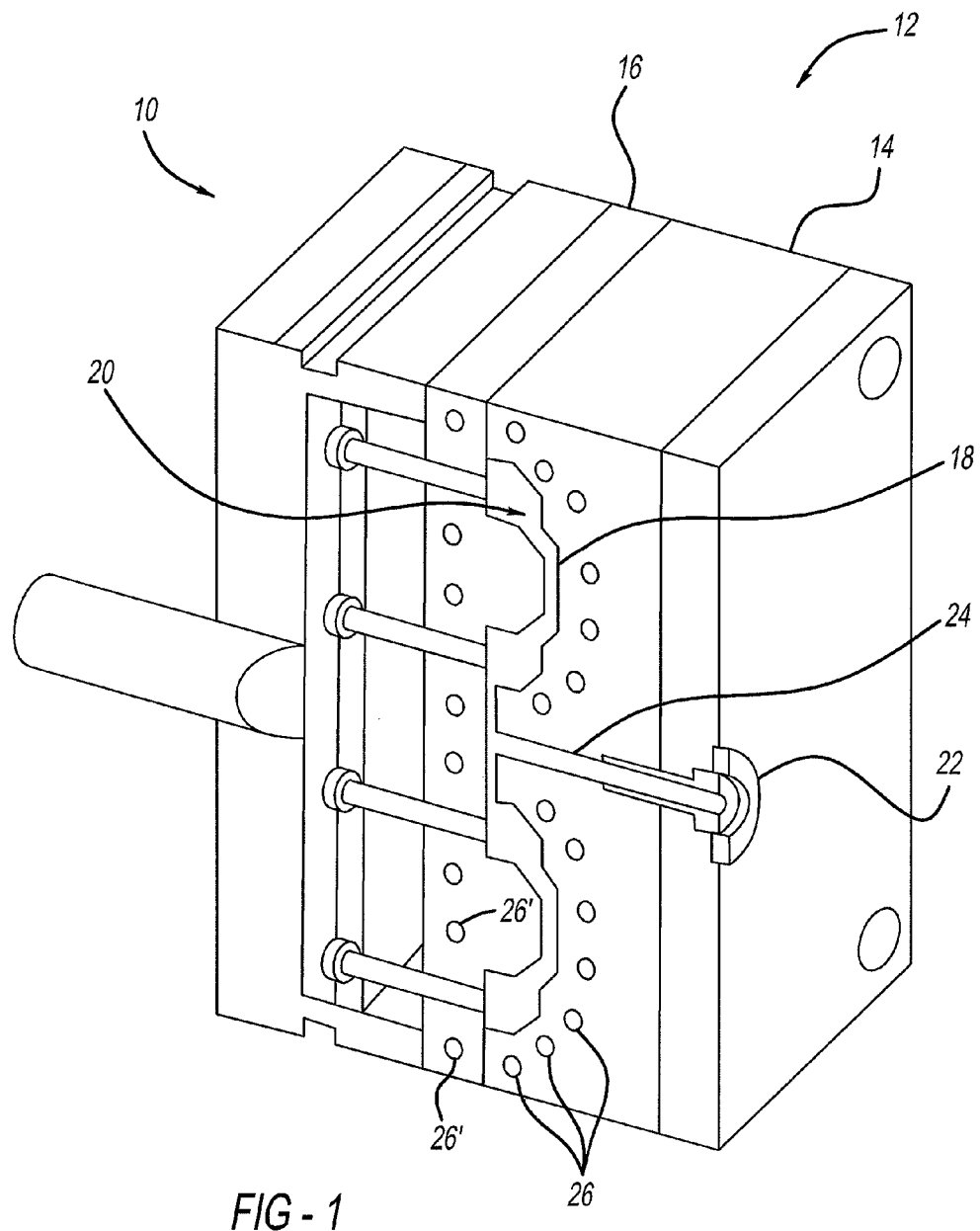
FIG. 1 is a cross-sectional perspective view of a mold tool in the closed position forming a cavity with a newly formed molded part undergoing cooling with nanofluid.
Figure 2:
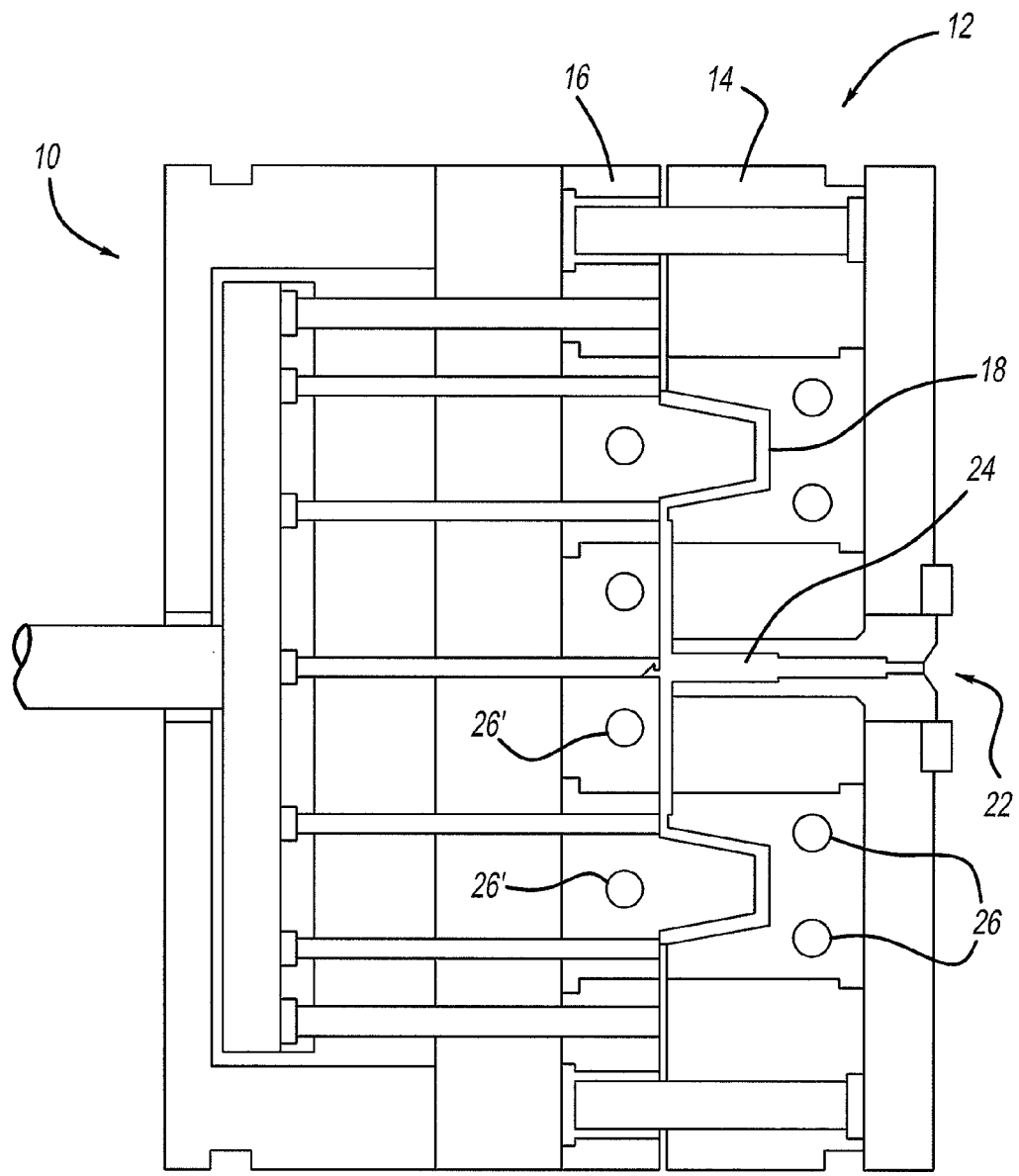
FIG. 2 is a cross-sectional plan view of a mold tool in the closed position forming a cavity with a newly formed molded part undergoing cooling with nanofluid.

Referring now to FIGS. 1 and 2, a mold arrangement 10 is depicted. A mold tool 12 having movable pieces 14, 16 is shown. It is within the scope of this invention for the mold tool 12 to have more than two moveable pieces, depending on the needs of a particular application. The movable pieces 14, 16 of the mold tool 12 have surfaces that form a mold cavity 18 when the movable pieces are placed in the closed position. The mold tool 12 according to the present invention can be used for any type of molding or forming process that would require or benefit from the use of cooling fluids flowing through the mold tool 12 in order to cool a newly formed part 20. It is within the scope of this invention for the mold tool 12 to be used in processes including, but not limited to injection molding, compression molding, resin transfer molding, metal pressing, etc.

The movable pieces 14, 16 are movable between an open position and a closed position where they form a mold cavity 18. In the present embodiment of the invention, there is at least one injection port 22 or sprue for injecting molten resin material 24 into the area where the mold cavity 18 for forming the molded part is located when the at least two moveable pieces are in the closed position. Depending on the application or the type of mold tool 12, the molten resin might be injected when the movable pieces 14, 16 are in the open or closed position or both. While the present invention describes a single injection port, it is within the scope of this invention for several injection ports to be implemented. In applications where the mold tool 12 compresses the molten resin during formation of the molded part the movable pieces 14, 16 move between compressed and decompressed states for applying compression to the molten resin 24 in order to form the molded part 20. Once the molten resin begins to solidify, the mold tool 12 in some embodiments is moved to a decompressed state and the molded part 20 begins to cool.

Figure 3:
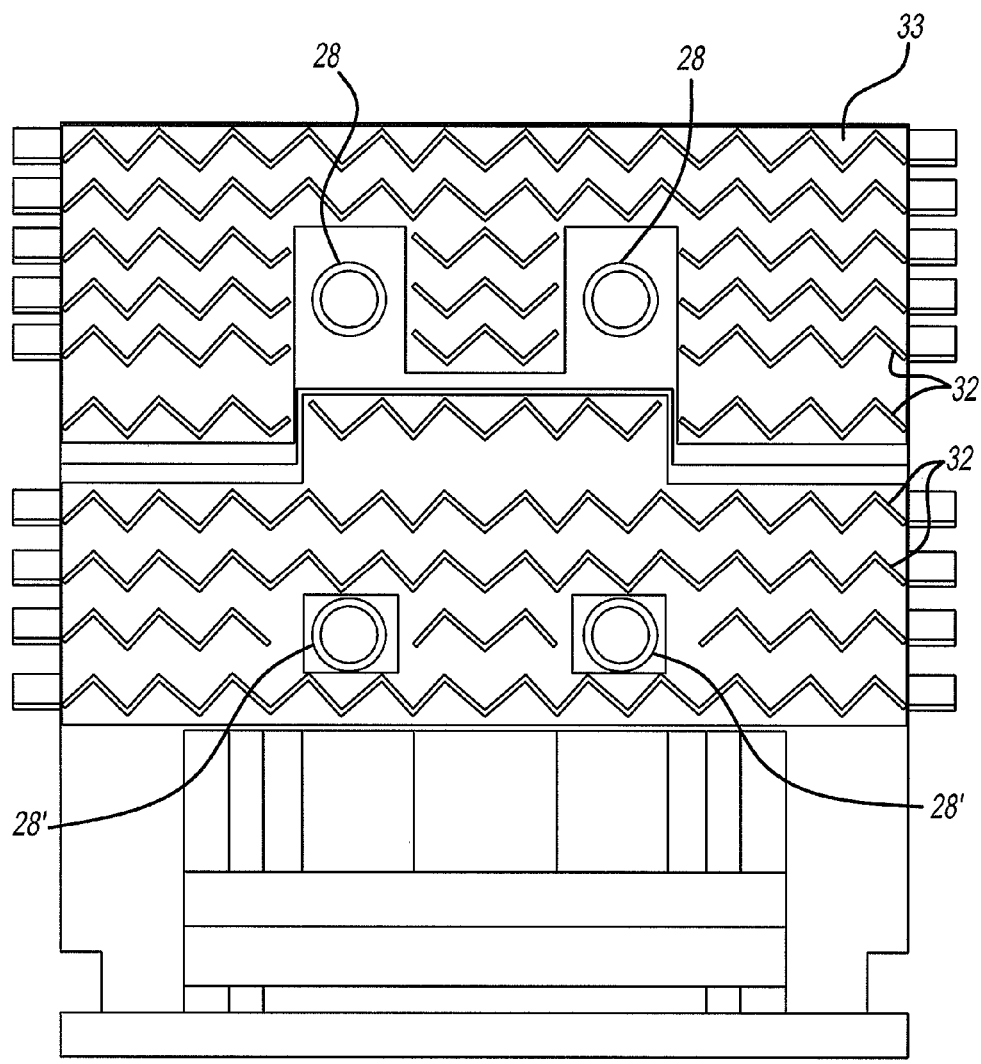
FIG. 3 is a side plan view of a mold tool having cooling fins in accordance with an alternate embodiment of the invention.
Figure 4:
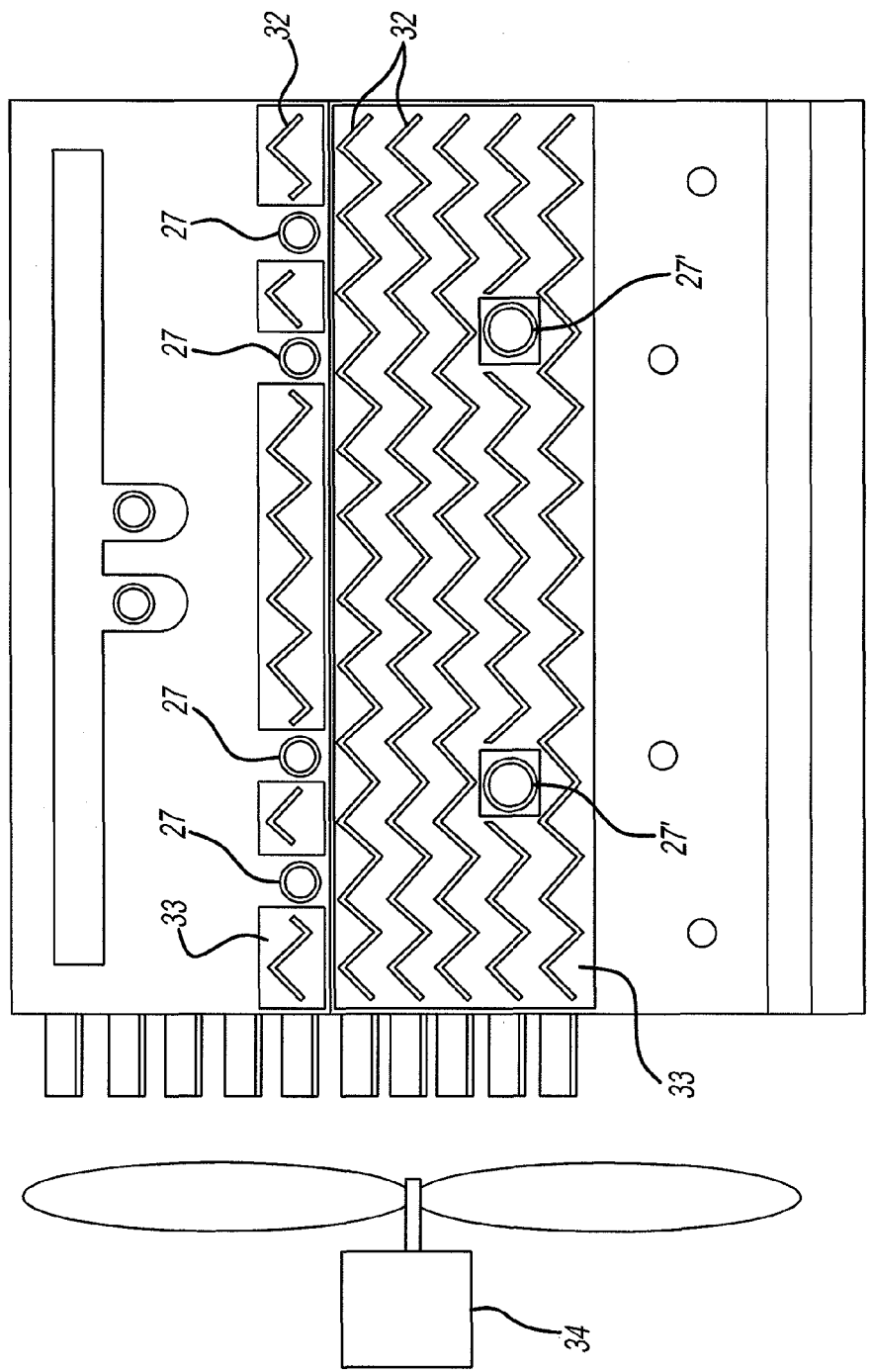
FIG. 4 is a side plan schematic view of a mold tool having cooling fins and a cooling fan in an alternate embodiment of the invention.

In order to cool the molded part 20, a plurality of cooling passages 26, 26' are formed in both moveable pieces 14, 16 of the mold tool 12. Cooling fluid, which in the present invention is nanofluid, flows through the cooling passages 26, 26' between cooling inlets 28, 28' (shown in FIG. 3) and cooling outlets 27, 27' (shown in FIG. 4) on each of the moveable pieces 14, 16 that have cooling passages 27, 27'. It is within the scope of the invention for the cooling passages 26, 26' on each of the moveable pieces 14, 16 to flow between a single cooling inlet or single cooling outlet or it is within the scope of this invention for each of the cooling passages 26, 26' to have their own individual cooling inlet and outlet (as shown in FIGS. 3 and 4) depending on the needs of a particular application. Also while a plurality of cooling passages 26, 26' are shown, it is within the scope of the present invention to have any number of cooling passages and to have them located on either just one or all of the moveable pieces 14, 16. As the cooling fluid flows through the mold tool 12 and exits the cooling outlets 27, 27' heat is wicked away from the mold cavity 18 and molded part 20 by thermal conduction. The heated nanofluid leaving the cooling outlets 27, 27' is recirculated through a heat reservoir recirculation pump arrangement and cooling tower located outside the mold tool 12, where the heated nanofluid is cooled to remove the heat absorbed by the nanofluid that flowed through the cooling passages 26, 26'. The cooled nanofluid is then recirculated back to the cooling inlets 28, 28'.

In an alternate embodiment of the invention, shown in FIGS. 3 and 4, the moveable pieces 14, 16 have cooling fins 32 connected to the moveable pieces 14, 16, on the outside surface of the mold tool 12, exposed to the external environment. The cooling fins 32 are formed on a flange 33 that is connected to the outside surface of the mold tool 12 and the flange 33 and cooling fins act as a heat sink, which cools the mold tool 12 by increasing the exposed surface area of the mold tool 12. The flange 33 and cooling fins 32 are positioned adjacent the cooling inlets 28, 28' and cooling outlets 27, 27' to remove heat from the nanofluid flowing through the cooling passages 26, 26' by acting as a heat sink to facilitate the removal of heat from the mold tool 12 by increasing the exposed surface area on the mold tool 12. The flange 33 of the cooling fins 32 are connected to the outside surface of the mold tool 12 using fasteners, welds or other suitable connection mechanisms. While the present embodiment of the invention shows the cooling fins 32 connected to a flange 33 that is fastened to the surface of the mold tool 12, it is within the scope of this invention for the cooling fins 32 to be formed on or connected directly to the outer surface of the mold tool 12.

FIG. 4 depicts an additional embodiment of the invention schematically showing a fan 34 near the cooling fins 32 of the mold tool 12. The fan 34 generates air flow past the cooling fins 32 to further assist in the cooling of the part within the mold tool 12. The fan 34 can be located at any location necessary to allow the air to flow past the cooling fins 32.

The use of the, flange 33, cooling fins 32 and a fan 34 are optional features of the invention useful in some applications in addition to the use of nanofluid for cooling the molded part 20 and mold cavity 18. It is within the scope of this invention for a mold tool to have nanofluid, cooling fins and a fan all in combination, while other embodiments of the invention include the use of cooling fins on a mold tool without using a fan or nanofluid. Still other embodiments of the invention include using cooling fins without a fan or nanofluid. Yet other embodiments of the invention include using nanofluid in combination with cooling fins and no fan being included in the arrangement. The particular combination of cooling features described above will depend on several factors including, but not limited to the size of the mold, type of mold tool, number of moveable parts, mold tool composition, size of molded part, etc.

The cooling fluid in accordance with the present invention is a nanofluid having a colloidal suspension of thermally conductive nanoparticles suspended in an aqueous or organic solution (such as, but not limited to, ethyl alcohol). The nanoparticles are thermally conductive so that the nanofluid will "wick" away or absorb the heat from the molded part. The use of nanofluids has been shown to be more effective than other cooling fluids, including water.

The nanoparticles contained in the nanofluid in accordance with the present invention include, but are not limited to, oxides such as aluminum oxide, zirconium oxide, silicon oxide and copper oxide, metals including aluminum, copper, magnesium, silver, gold and carbon fibers, carbon nanotubes as well as carbon black particles and agglomerates. The nanoparticles in accordance with the present invention are generally between 1-100 nm.

Generally speaking, the nanofluid is produced by one of two techniques. The first is a single step technique where the nanoparticles are dispersed directly into a base fluid. This has been shown to work best for metallic nanofluids. The second is a two step technique that starts with producing nanoparticles by a physical or chemical process, such as evaporation and inert-gas condensation processing and then proceeding to disperse the nanoparticle into the base fluid. Most of the nanofluids are produced by the two step method. Additionally, it is possible to form a nanoparticle fluid using multi-beam laser ablation in liquids in order to control the nanoparticle size and distribution within the nanofluid.

Creation of an appropriate nanofluid and selection of appropriate nanoparticles generally depend upon eight factors including:

Particle volume concentration;
Particle materials;
Particle size;
Particle shape;
Base fluid material;
Temperature;
Additive; and
Acidity.

The size or shape of the particles can affect what is commonly referred to Brownian motion. Brownian motion, as it relates to the present invention, is referring to the random drifting of particles suspended in a fluid and the mathematical models used to describe the random movements. The nanoparticles in the present invention have an effect on the random drifting of the particles suspended in the fluid as the particles come into contact and absorb heat from the molded part during the cooling process. The size and shape of the nanoparticles presents a large surface area for absorbing heat from the molded part. As a result, the size and shape of the nanoparticles improves absorption of heat from the molded part.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mold arrangement comprising:
    a mold tool having one or more movable pieces forming a mold cavity defined by said one or more pieces, said mold cavity defining a surface for creating a molded part;
    at least one injection port for injecting molten resin into said mold cavity and forming said molded part;
    a nanofluid having a colloidal suspension of thermally conductive nanoparticles suspended in an aqueous solution or organic solution, wherein said nanofluid is used to cool said molded part;
    at least one cooling passage for flowing the nanofluid through said mold tool to cool said molded part;
    cooling fins connected to a flange that is fastened to the outer surface of one or more moveable pieces of the mold, wherein the cooling fins are positioned adjacent cooling inlets connected to the at least one cooling passage and cooling outlets connected to the at least one cooling passage; and a fan positioned relative to the cooling fins for flowing air past the cooling fins to remove heat from the mold tool.

2. The mold arrangement of claim 1, wherein the nanofluid contains nanoparticles that are one or more of the group consisting essentially of aluminum oxide, zirconium oxide, silicon oxide, copper oxide, aluminum, copper, magnesium, silver, gold, carbon fibers, carbon nanotubes, carbon black particles and carbon black agglomerates.

3. A mold arrangement consisting essentially of:
a mold tool having one or more movable pieces forming a mold cavity defined by said one or more moveable pieces, said mold cavity defining a surface for creating a molded part;
at least one injection port for injecting molten resin into said mold cavity and forming said molded part;
a nanofluid having a colloidal suspension of nanoparticles that are one or more of the group consisting essentially of aluminum oxide, zirconium oxide, silicon oxide, copper oxide, aluminium, copper, magnesium, silver, gold, carbon fibers, carbon nanotubes, carbon black particles and carbon black agglomerates;
at least one cooling passage for flowing nanofluid through said mold tool to cool said molded part; and
cooling fins connected to a flange that is fastened to the outer surface of one or more moveable pieces of the mold, wherein the cooling fins are positioned adjacent cooling inlets connected to the at least one cooling passage and cooling outlets connected to the at least one cooling passage; and
a fan positioned relative to the cooling fins for flowing air past the cooling fins to remove heat from the mold tool.

4. A method of cooling a part formed within a mold arrangement comprising the steps of:
providing a mold tool having one or more movable pieces forming a mold cavity defined by said one or more moveable pieces, said mold cavity defining a surface for creating a molded part, said one or more movable pieces has at least one cooling passage;
providing cooling fins connected to a flange that is fastened to an outer surface of one or more moveable pieces of the mold, wherein the cooling fins are positioned adjacent cooling inlets connected to the at least one cooling passage and cooling outlets connected to the at least one cooling passage;
providing a fan positioned relative to the cooling fins for flowing air past the cooling fins to remove heat from the mold tool;
providing at least one injection port for injecting molten resin into said mold cavity and forming said molded part;
providing a nanofluid having a colloidal suspension of thermally conductive nanoparticles suspended in an aqueous solution or organic solution, wherein said nanofluid is used to cool said molded part;
injecting molten resin into said mold cavity;
forming said molded part, wherein said mold tool and said molded part contain thermal energy;
flowing nanofluid through said at least one cooling passage to absorb said thermal energy from said molded part and said mold tool;
transferring said thermal energy from said nanofluid and said one or more moveable pieces to said cooling fins;
radiating heat from said cooling fins away from the mold tool; and
flowing air past the cooling fins to remove heat from the cooling fins and the mold tool.

5. The method of claim 4, wherein the nanofluid contains nanoparticles that are one or more of the group consisting essentially of aluminum oxide, zirconium oxide, silicon oxide, copper oxide, aluminum, copper, magnesium, silver, gold, carbon fibers, carbon nanotubes, carbon black particles and carbon black agglomerates.

* * * * *